3,705,867
REDUCED SLUDGE FORMATION IN LARGE
PARTICLE TETRAFLUOROETHYLENE POLYMER AQUEOUS DISPERSION
David Alan Holmes, Vienna, W. Va., assignor to E. I. du Pont de Nemours and Company, Wilmington, Del.
No Drawing. Continuation-in-part of application Ser. No. 72,498, Sept. 15, 1970. This application Dec. 23, 1970, Ser. No. 101,105
Int. Cl. C08f 45/24
U.S. Cl. 260—29.6 F
5 Claims

ABSTRACT OF THE DISCLOSURE

Sludge formation in large particle, i.e., average particle diameter of at least 0.25 micron, tetrafluoroethylene polymer aqueous dispersion is reduced by adding ethoxylated aliphatic alcohol nonionic surfactant to the dispersion to reach a concentration of at least 7.0 percent based on the weight of the polymer solids in the dispersion. At a dispersion pH of greater than 7 and surfactant content sufficient to give the dispersion a viscosity of at least 30 centipoises, the formation of brown scum on the surface of the dispersion is eliminated.

---

This application is a continuation-in-part of copending application Ser. No. 72,498, filed Sept. 15, 1970 by the same inventor.

This invention is directed to tetrafluoroethylene polymer aqueous dispersions and more particularly to a process for reducing the tendency of sludge to form therein during room temperature storage when the polymer particles are at least 0.25 micron in average particle diameter.

The preparation of polytetrafluoroethylene aqueous dispersions is disclosed in U.S. Pat. Nos. 2,559,752 to Berry, 2,534,058 to Renfrew and 2,559,749 to Benning. Briefly the process involves pressuring tetrafluoroethylene into an aqueous solution of polymerization initiator and dispersing agent under mild agitation to produce an aqueous dispersion of 15 to 45 percent by weight of colloidal size particles having an average particle diameter as determined by the light scattering technique to be described hereinafter to 0.10 to 0.20 micron. Various methods have been developed to concentrate these dispersions to polymer solids levels of up to 75 percent by weight, without changing the particle size. In one method, from 6 to 12 percent nonionic surfactant based on the weight of polymer solids is added to the dispersion, followed by heating at 50 to 80° C. to form a supernatant clear liquid layer which is decanted to leave the lower layer as the concentrate (U.S. Pat. No. 3,037,953 to Marks and Whipple, see also U.S. Pat. No. 3,301,807 to Hoashi). Most of the nonionic surfactant ends up in the supernatant layer to leave a concentration of it in the lower layer of less than 4 percent based on the weight of polymer solids. Often additional nonionic surfactant was added to the lower layer or concentrated dispersion to increase its content of this ingredient to 6 percent based on the weight of polymer solids to thicken and/or improve the wettability of the dispersion.

Recently, a technique has been developed for increasing the particle size of the polymer particles in the dispersion by gradual addition of the dispersing agent during the initial period of the polymerization reaction, rather than all at once before commencing the reaction (U.S. Pat. No. 3,391,099 to Punderson). Particle sizes 0.25 micron (average particle diameter) and higher in the dispersion are prepared by this technique by maintaining the concentration of dispersing agent low during the early polymerization stage. These large particle dispersions have the advantage over the smaller particle dispersions of the same solids concentration prepared by the Berry, Renfrew, and Benning processes of being castable to thicker crack-free films per coat. Unfortunately, however, as the particle size of the polymer in the dispersion was increased, so did the tendency to form polymer sludge at the bottom of the vessel in which the dispersion was being stored. This sludge is irreversible, unfabricable coagulum and hence represents a loss of polytetrafluoroethylene.

The present invention provides a process for overcoming this disadvantage of the large particle polytetrafluoroethylene aqueous dispersions. It has been discovered that in such dispersions in which the polymer particle size is at least 0.25 micron, the addition of an effective amount of ethoxylated aliphatic alcohol nonionic surfactant to the dispersion to reach a concentration of at least 7.0 percent by weight based on the weight of polymer solids in the dispersion eliminates sludge formation during prolonged storage at room temperature (20–25° C.).

Another aspect of the present invention is that a brown scum which appears on the surface of the aqueous dispersion during storage is virtually eliminated when the amount of ethoxylated aliphatic alcohol nonionic dispersing agent added is also sufficient to increase the viscosity of the dispersion to at least 30 centipoises as measured by a Brookfield Viscometer operating at 60 r.p.m. and 25° C. using spindle No. 2.

The polytetrafluoroethylene aqueous dispersion component of composition of this invention can be made by the process disclosed in the Punderson patent, especially Example 10 thereof. Any polymerization initiator and dispersing agent can be used so long as the end result obtained is the aqueous dispersion of polytetrafluoroethylene. Typically, however, the initiator will be a water-soluble peroxy compound such as an inorganic persulfate, e.g. ammonium persulfate, or an organic peroxide, e.g. disuccinic acid peroxide, and the dispersing agent used during polymerization will be an anionic dispersing agent which imparts a negative charge to the polymer particles in the dispersion. The most common anionic dispersing agents are the fluorinated carboxylic acid or carboxylates, e.g. ammonium polyfluorocarboxylates containing from 7 to 10 carbon atoms. The amount of dispersing agent often used is from 0.2 to 0.4 percent based on the weight of polymer solids.

The dispersion component of compositions of this invention can be used as received from polymerization or can be concentrated in accordance with known procedures, e.g., the process disclosed in the Marks and Whipple patent. In any event, sufficient of the nonionic surfactant is added to the dispersion so that it has a concentration of the surfactant of at least 7 percent based on the weight of polymer solids in the composition (dispersion).

The polytetrafluoroethylene dispersion will contain 45 to 75 percent by weight polymer solids based on the total weight of the dispersion and the average particle diameter of the polymer is at least 0.25 micron. The average particle diameter of the particles in the dispersion is measured by a relationship based on light scattering theory, from the percentage of incident light transmitted at 546 millimicron wavelength through a unit measure of a dilute dispersion (about 0.02 weight percent solids), using a nominal value of 0.020 cc./gram for the refractive index increment $\Delta n / \Delta c$, of said dispersion at 25° C. since the measurement is made on dispersions containing nonionic surfactant. The particle size so obtained is an average particle diameter in the particles measured, and in theory, is nearly equal to the weight average particle diameter as confirmed by ultracentrifuge analysis, or by direct measurement using electron micrographs of the particles at 20,000 diameters magnification. The particles can be spherical or irregularly shaped such as elongated in shape. The preferred average particle diameter for the polymer particles in the dispersion is from 0.32 to 0.45 micron.

The nonionic surfactant component of composition of the present invention is any ethoxylated aliphatic alcohol which is soluble in water at room temperature (20–25° C.) at the concentration desired. The surfactant can be composed of a single surfactant or a mixture of such surfactants. The surfactant preferably should have sufficient volatility so that it is essentially burned out of the polytetrafluoroethylene during its sintering which is generally done at a temperature in the range of 340 to 400° C. for 5 seconds to 10 minutes. Typically, the surfactant is prepared as a reaction product of ethylene oxide with saturated and unsaturated aliphatic alcohols. Illustrative of such reaction products are those represented by the formula $RO(A)_nH$, wherein $(A)_n$ is the group $(C_2H_4O)_n$ or a mixture of the groups $(C_2H_4O)_a$ and $(C_3H_6O)_b$, wherein $n$ is in each instance an integer of from 2 to 50 and preferably 2 to 18, $b$ is an integer of 0 to 30, and $a$ is an integer of at least 2, $a+b$ being equal to $n$, it being understood that the value of $n$, $a$, and $b$ for the aforementioned groups becomes the value of $n$ in the formula when the group is substituted into the formula; and R is an aliphatic hydrocarbon group which can be saturated or unsaturated, straight-chain, branched, or cyclic, and will generally contain from 8 to 24 carbon atoms, preferably from 8 to 18 carbon atoms. Examples of R groups include oleyl, stearyl, tridecyl, lauryl and decyl. The hydrophobic and hydrophilic moieties of the surfactant are proportioned and the total molecular weight is such that the aforementioned requirement of water solubility is met and preferably that the aforementioned degree of volatility is also met. Specific ethoxylated, aliphatic alcohol surfactants include $CH_3(CH_2)_4CH_2(OCH_2CH_2)_3OH$;

$$CH_3(CH_2)_6CH_2(OCH_2CH_2)_3OH;$$

$$CH_3(CH_2)_{10}CH_2(OCH_2CH_2)_{12}(OCH(CH_3)CH_2)_5OH;$$

$$CH_3(CH_2)_8CH_2(OCH_2CH_2)_{10}OH;$$

and $$CH_3(CH_2)_8CH_2(OCH_2CH_2)_5OH.$$

The nonionic surfactant is added to the dispersion prior to storage, in the form of the agent by itself or as a concentrated solution in water. The dispersion is then subjected to mild stirring to disperse the surfactant and then the dispersion is stored. Surprisingly, the concentration of the nonionic surfactant in the dispersion required to eliminate sludge therefrom is inversely proportional to the polymer solids content in the dispersion. For example, at polymer solids concentrations above 65 percent by weight, only about 7 percent or slightly higher of the surfactant is required whereas in the low polymer solids concentration range of 45 to 55 percent by weight, generally at least 10 percent of the surfactant based on polymer solids is required. Typically, no more than 14 percent of the nonionic surfactant is required for sludge elimination for most polymer solids concentrations. For the preferred concentration of polymer solids of 55 to 65 percent based on the total weight of the dispersion, at least 8.5 percent of the surfactant based on the weight of polymer solids will be required for sludge elimination. The effectiveness of the surfactant also varies with the particle size of the polymer particles. Therefore, for each particular dispersion, the amount of nonionic surfactant is selected to be effective in eliminating sludge under the conditions of particle sizes and polymer solids present in the dispersion.

With respect to the aspect of eliminating brown scum from the dispersion, the amount of the nonionic surfactant that will be required to do this job in addition to preventing sludge formation will vary with the particular surfactant used and the starting viscosity of the dispersion. At the preferred polymer solids concentration of 55 to 65 percent by weight for the dispersion, the typical viscosity of the dispersion containing as much as 6 percent of the surfactant based on the weight of polymer solids will be about 20 centipoises, measured as hereinbefore described. Preferably, the amount of surfactant added to the dispersion is such that it increases the viscosity of the dispersion to at least 35 centipoises measured as hereinbefore described.

To further describe the brown scum phenomenon, it has been found that two conditions are necessary for the brown scum to form on the surface of the dispersion. First, nonionic surfactant must be present in the dispersion, and the growing tendency to use such surfactant for concentrating the dispersion and to improve subsequent processing, up to 6 percent based on the weight of polymer solids, has already been described herein. Second, the dispersion must have a pH of greater than 7, which is obtained by dissolving a basic compound in the normally acidic dispersion. It has become customary to supply dispersions in such basic form in order to minimize corrosion of handling and fabricating equipment. Moreover, use of the dispersion concentration process as described in the aforementioned Marks and Whipple and Hoashi patents may involve adding a basic compound to the dispersion to increase the rate of concentration.

With this coming together of the steps of adjusting the pH to greater than 7 and adding nonionic surfactant to the aqueous dispersion, has arisen the problem that a scum of brownish color formed on the surface of the dispersion during standing. Attempted removal of the brown scum by skimming has met with limited success, nevertheless this has been the method chiefly used for the past 15 years. Failure to remove all the scum has often resulted in the formation of dark specks in the final polymer product.

The brown scum is caused by the presence of iron in the dispersion which is believed to come from two major sources, from corrosion by the aqueous polymerization medium of the polymerization vessel and from the powdered iron intentionally added to the many polymerization media in order to increase the polymerization rate (as described in U.S. Pat. 2,750,350 to Kroll) even though not greater than 10 parts per million of the powdered iron based on the weight of the water present in the polymerization medium is added. However, the brown scum occurs even when powdered iron is not added.

Preferably, the aqueous dispersions of the present invention in which sludge settles out during storage have a pH of greater than 7, and more preferably from 8 to 11, which also gives rise to the formation of brown scum on the surface of the dispersion, and sufficient of the ethoxylated aliphatic alcohol nonionic surfactant is added to the dispersion to accomplish both tasks of reducing the sludge formation and eliminating the brown scum. Any water soluble basic compound can be used to adjust the pH of the dispersion to the basic pH desired, examples of such compounds being an ammonium compound such as ammonium hydroxide or an ammonium salt such as ammonium carbonate. The basic compound is added in aqueous solution either with or after addition of the nonionic surfactant to the dispersion.

Typically, the minimum level of 7 percent by weight of the surfactant and preferred minimum of 8.5 percent by weight of the surfactant required for the reduction of sludge formation will not suffice to eliminate brown scum in the dispersions having the preferred polymer solids content of 55 to 65 percent by weight. However, as additional of the surfactant is added to the dispersion, there occurs a point at which only small increments of the surfactant greatly extends the time that it takes brown scum to form.

By way of example, an aqueous dispersion of polytetrafluoroethylene was prepared in which the average particle diameter of the polymer was 0.34 micron, and sufficient aqueous solution of $NH_4OH$ was added to adjust the pH of the dispersion from about 3 to 9.5 and to give a polymer solids content of 60 percent by weight. Upon addition of 1.5 percent "Alfonic" 1012-60 and 7.5 percent DN-65 of ethoxylated aliphatic alcohols, based on the weight of polymer solids, to the dispersion, the dispersion exhibited a viscosity of 23 centipoises and upon standing for one day, a brown scum appeared. The formula of "Alfonic" 1012-60 and DN-65 are disclosed hereinafter. These surfactants are added to the dispersion as part of a procedure for concentrating the dispersion, as described in U.S. patent application Ser. No. 72,497 filed Sept. 15, 1970 by Holmes, and particularly Example 2 thereof. The compositions in the additional examples disclosed hereinafter were similarly prepared. When additional DN-65 was added to the dispersion to increase its viscosity to 35 centipoises, no brown scum appeared in the dispersion upon three months storage under the same conditions. The same result was obtained when still further amounts of DN-65 were added to samples of the dispersion to increase their viscosities to 57 and 160 centipoises. These viscosities are measured by using a Brookfield viscometer under the conditions described hereinbefore. The amounts of DN-65 required to increase the viscosity from 23 to 35 was 0.2 percent based on the weight of polymer solids in the dispersion. The DN-65 content of the dispersion having a viscosity of 160 centipoises was about 9.7 percent based on the weight of polymer solids, to give a total non-ionic surfactant content (including "Alfonic" 1012-60) of 11.2 percent by weight. For all these dispersions, the amount of sludge formed during storage was less than that which formed in the same dispersion but at surfactant contents of 6 percent based on the weight of polymer solids and less.

The dispersions of the present invention can be used in the same manner as the tetrafluoroethylene polymer aqueous dispersions known heretofore without the disadvantages that sludge and brown scum posed to such dispersions.

The method used for measuring the percent solids and percent surfactant in the dispersions disclosed herein is described below. A 5±0.5 g. sample, weighed to the nearest 0.0001 g. was heated at 100±1° C. in a circulating air oven for 90 minutes. After cooling, the sample was reweighed to the nearest ±0.0001 g. The sample was then heated for 10±1 minutes at 380° C. in a circulating air oven. After removal from the oven and cooling, the sample was weighted to the nearest 0.0001 g. The percent solids was found by dividing the final weight by the initial weight. The percent surfactant was found by dividing the net weight change during final heating (380° C.) by the final weight.

The settling of dispersion formulations is measured in the following manner. Approximately 100 ml. of a dispersion was added to a graduated cylinder which was tightly capped and stored on a shelf at room temperature (20-25° C.). Approximately every two weeks, the cylinder was slowly inverted two times and the level of nondispersable sludge was recorded. The level of sludge was measured when the cylinder was turned upside down. The greater the sludge buildup, the poorer the shelf life stability.

Films of polytetrafluoroethylene approximately 4 inches by 6 inches by 4 mil thick were prepared in the following manner. A semi-circular drum 4.5 inches in diameter was covered with a sheet of 7 by 9 inch aluminum foil (0.005" thick) and crimped over the edges of the drum. The foil was free of creases and bulges and conformed to the shape of the drum. A coating of polymer was made on the foil by turning the drum slowly and evenly through a 100 ml. sample of the dispersion being tested which was contained in a plastic trough. The foil was immersed to a depth of about one eighth of an inch. The total time any one part of the foil was in the dispersion was approximately 5 seconds. The foil was then removed from the drum and heated 5 minutes at 100° C. and subsequently for 4 minutes at 380° C. Six coats were made in this manner. The film was then dissolved away from the aluminum foil over a period of about one hour using a strong aqueous solution of sodium hydroxide and was then washed thoroughly in demineralized water.

The following are additional examples of the improved shelf life obtained by the process of the present invention (parts and percents are by weight unless otherwise indicated):

EXAMPLE 1

The elimination of sludge from various polytetrafluoroethylene aqueous dispersions was measured using the procedure for measuring settling described hereinbefore. The polymer solids content of each dispersion was about 60 percent based on the weight of the dispersion, and the average particle diameter of the polymer particles in each dispersion was 0.37 micron. The pH of each dispersion was about 9.5, and each dispersion contained a mixture of "Alfonic" 1012-60 and DN-65 nonionic surfactants having the formulae $CH_3(CH_2)_8CH_2(OCH_2CH_2)_5OH$ and $CH_3(CH_2)_xCH_2((OCH_2CH_2)_y(OCH_3H_6)_zOH$, wherein $x$, $y$ and $z$ are 10 to 11, 12 to 13, and 4 to 5, respectively. The results of these experiments and further details are shown in Table I. The tetrafluoroethylene dispersions containing at least 9.4 percent surfactant based on polymer solids have good shelf life stability as the small amount of sludge build-up indicates.

TABLE I

| Alfonic 1012-60, weight percent | DN-65, weight percent | Total surfactant, weight percent [1] | Sludge level (ml.) after indicated time | | |
|---|---|---|---|---|---|
| | | | 2 mo. | 3 mo. | 5 mo. |
| 1.0 | 5.5 | 6.5 | 6 | 10 | 13 |
| 1.4 | 8.0 | 9.4 | 1 | 1 | 1 |
| 1.5 | 8.0 | 9.5 | 1 | | |
| 1.6 | 8.0 | 9.6 | 1 | 1 | 1 |

[1] Based on weight of polymer solids.

EXAMPLE 2

The shelf life stability of polytetrafluoroethylene aqueous dispersions with 52 and 60% polymer by weight and a particle size of 0.37 micron for each dispersion was measured. The results of these experiments are shown in Table II.

TABLE II

| Dispersion formulation | | | | Sludge level (ml.) after indicated time | | |
|---|---|---|---|---|---|---|
| Surfactant | Percent [1] | Total surf., percent | Solids, percent | 2 mo. | 3 mo. | 4 mo. |
| "Alfonic" 1012-60 / DN-65 | 1.5 / 7.5 | 9.0 | 52 | 10 | 11 | 16 |
| "Alfonic" 1012-60 / DN-65 | 1.4 / 8.0 | 9.4 | 60 | 1 | 1 | 1 |

[1] Based on solids.

EXAMPLE 3

The shelf-life stability of polytetrafluoroethylene aqueous dispersions formula with 72 and 60% polymer by weight and a particle size of 0.37 micron for each dispersion was measured. The results of these experiments are shown in Table III.

TABLE III

| Dispersion formulation | | | | Sludge level (ml.) | | |
|---|---|---|---|---|---|---|
| Surfactant | Percent | Total surf., percent | Solids, percent | 2 mo. | 3 mo. | 4 mo. |
| "Alfonic" 1012-60 / DN-65 | 1.5 / 5.5 | 7.0 | 71.9 | 1 | 2 | 3 |
| "Alfonic" 1012-60 / DN-65 | 1.5 / 5.5 | 7.0 | 60.0 | 6 | 10 | 13 |

When an ethoxylated alkyl phenol such as "Triton" X-100 is substituted in the same amount for the ethoxylated aliphatic alcohols in compositions of this invention, the less volatile ethoxylated alkyl phenol gives the sintered polytetrafluoroethylene film a poorer color.

In the foregoing Examples 2 and 3, the pH of the dispersions were almost 9.5 obtained by adding NH$_4$OH to the dispersion after adding the "Alfonic" surfactant. In the dispersion of Example 1 having a total surfactant content of 6.5 percent by weight, the viscosity of the dispersion was about 20 and brown scum appeared on the top thereof during the storage, whereas the remaining dispersions of the example, which had viscosities of 60 to 70 centipoises, did not exhibit any brown scum. In the dispersion of Example 2 having the polymer solids content of 52% by weight based on the weight of the dispersion, the viscosity of the dispersion was about 12 and brown scum appeared during storage, whereas the dispersion with 60 percent by weight polymer solids had a viscosity of about 60 centipoises and exhibited no brown scum during the storage. In Example 3, the dispersion having a polymer solids content of 71.9 percent by weight had a viscosity in excess of 75 centipoises and no brown scum appeared during storage, whereas the dispersion having 60 percent by weight polymer solids had a viscosity of about 23 centipoises and brown scum did appear during storage of the dispersion.

The polytetrafluoroethylene in the aqueous dispersions of this invention can consist of the homopolymer or can be a copolymer with copolymerizable ethylenically unsaturated monomer. For example, the homopolymer can include small amounts of co-monomer modifier, wherein the homopolymer still retains its non-melt fabricable character, such as up to two percent by weight of polymer units derived by copolymerization with tetrafluoroethylene of perfluoroalkyl- or oxyperfluoroalkyl trifluoroethylene of 3 to 10 carbon atoms, and preferably hexafluoropropylene, as disclosed in U.S. Pat. 3,142,665 to Cardinal, Edens, and Van Dyk. Larger amounts of these monomers or other monomers can be present in amounts up to 35 percent by weight to render the resultant copolymer melt fabricable. Examples of such copolymers include copolymers of tetrafluoroethylene with such monomers as hexafluoropropylene, as disclosed in U.S. Pat. 2,946,763 to Bro and Sandt, higher perfluoroalkenes such as those containing from 4 to 10 carbon atoms, perfluoro(alkyl vinyl ethers) such as perfluoroethyl or perfluoropropyl vinyl ether, disclosed in U.S. Pat. 3,132,123 to Harris and McCane, perfluoro-(2-methylene-4-methyl-1,3-dioxolane) disclosed in U.S. Pat. 3,308,107 to Selman and Squire, and the highly fluorinated monomers in which a single hydrogen is present which does not change the fluorocarbon character of the copolymer, such monomers being for example 2-hydroperfluoroalkene containing 1 to 3 carbon atoms such as 2-hydropentafluoropropene, the omega-hydroperfluoroalkenes containing from 3 to 10 carbon atoms, and the omega-hydroperfluoro(alkyl vinyl ethers) in which the alkyl group contains from 1 to 5 carbon atoms.

As many apparently widely different embodiments of this invention may be made without departing from the spirit and scope thereof, it is to be understood that this invention is not limited to the specific embodiments thereof except as defined in the appended claims.

I claim:

1. A composition consisting essentially of an aqueous dispersion of 55 to 65 percent by weight of polytetrafluoroethylene particles in water, wherein the polymer has an average particle diameter of at least 0.25 micron, said dispersion having a pH of greater than 7 and containing at least 7 percent based on the weight of said polymer of ethoxylated aliphatic alcohol nonionic surfactant, said surfactant being present in an effective amount to reduce the formation of sludge in said dispersion and in sufficient amount for said dispersion to have a viscosity of at least 30 centipoises.

2. The composition of claim 1 wherein the average particle diameter is from 0.32 to 0.45 micron, the weight of polymer in said dispersion is 55 to 65 percent by weight, and the amount of said surfactant present is at least 8.5 percent.

3. The composition of claim 1 wherein said ethoxylated aliphatic alcohol has the formula ROA$_n$H, wherein A$_n$ is the group (C$_2$H$_2$O)$_n$ or a mixture of the groups (C$_2$H$_4$O)$_a$ and (C$_3$H$_6$O)$_b$, wherein $n$ in each instance is an integer of 2 to 50, $b$ is an integer of 0 to 30, $a$ is an integer of at least 2, $a+b$ being equal to $n$, and R is an aliphatic hydrocarbon group containing from 8 to 24 carbon atoms.

4. The composition of claim 3 wherein R contains from 8 to 18 carbon atoms.

5. The composition of claim 1 wherein said ethoxylated aliphatic alcohol is CH$_3$(CH$_2$)$_4$CH$_2$(OCH$_2$CH$_2$)$_3$OH, CH$_3$(CH$_2$)$_6$CH$_2$(OCH$_2$CH$_2$)$_3$OH,

CH$_3$(CH$_2$)$_{10}$CH$_2$(OCH$_2$CH$_2$)$_{12}$(OCH(CH$_3$)CH$_2$)$_5$OH

CH$_3$(CH$_2$)$_8$CH$_2$(OCH$_2$CH$_2$)$_{10}$OH, or

CH$_3$(CH$_2$)$_8$CH$_2$(OCH$_2$CH$_2$)$_5$OH

References Cited

UNITED STATES PATENTS

| | | | |
|---|---|---|---|
| 2,937,156 | 5/1960 | Berry | 260—29.6 F |
| 3,037,953 | 6/1962 | Marks et al. | 260—29.6 F |

HAROLD D. ANDERSON, Primary Examiner

U.S. Cl. X.R.

260—29.6 ME